Figure 1:
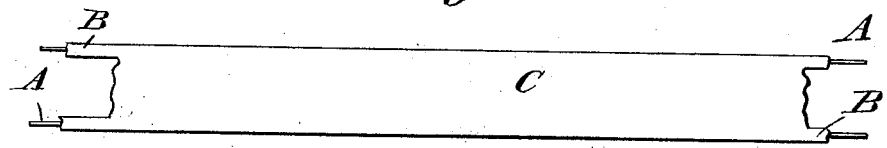

(No Model.)

G. H. BLAKESLEY.
ELECTRICAL CONDUCTOR.

No. 523,160.  Patented July 17, 1894.

Witnesses:
M. Benj. Holden
Alice E. Brown

Inventor:
Gilbert H. Blakesley,
By Newell & Jennings
His attys.

UNITED STATES PATENT OFFICE.

GILBERT H. BLAKESLEY, OF BRISTOL, CONNECTICUT.

ELECTRICAL CONDUCTOR.

SPECIFICATION forming part of Letters Patent No. 523,160, dated July 17, 1894.

Application filed April 7, 1893. Serial No. 469,492. (No model.)

*To all whom it may concern:*

Be it known that I, GILBERT H. BLAKESLEY, of Bristol, in the county of Hartford and State of Connecticut, have invented certain new and useful Improvements in Electrical Conductors, of which the following is a full, clear, and exact description.

My invention relates to a method for safely and conveniently conducting wires charged with electricity for the purpose of electric lighting, the transmission of telegraphic or telephonic communication, power for motors, or any other purpose which requires the use of two wires, one positive and one negative, one leading to the lamp or other instrument where the application of electric power is to be made and the other leading away therefrom.

It also relates to the use of electrical conductors when the instrument, such as an electric lamp, to which the electric current is conveyed and applied must for convenient use be capable of being conveniently moved from place to place or its position adjusted at different heights. Such conductors have hitherto been usually made of very fine wires enveloped in a braided covering for purposes of insulation, the positive and negative conductors being then twisted around each other.

The principal objects of my invention are to provide an electrical conductor which shall render the insulation more perfect; to decrease the expense of the same, both by rendering the insulation more perfect and simple, and by lessening the necessary amount of wire and insulating material; to supply a means of conducting electricity which shall be very simple and at the same time very convenient to use; to furnish an electrical conductor which can by many known appliances be lengthened or shortened at will, and one that, by a device hereinafter described, may be used to adjust at the will of the user the height of the electric lamp or any other appliance or instrument of which movement from place to place or adjustment at different heights adds to the convenience in the use.

My invention consists of two wires, cables, or conductors properly insulated, and incorporated into the edges of a non-conducting web, preferably a tape or material like that commonly called taste. The non-conducting web is broad enough and of sufficient consistency to keep the positive and negative wires or cables apart. This avoids the necessity for so much insulating material as is commonly used to cover the positive and negative cables.

In my conductor the positive and negative wires or cables both run straight and parallel to each other, instead of being twisted around each other. In this way I make a large saving in the length of the wire or cable needed for a given purpose.

Figure 2:
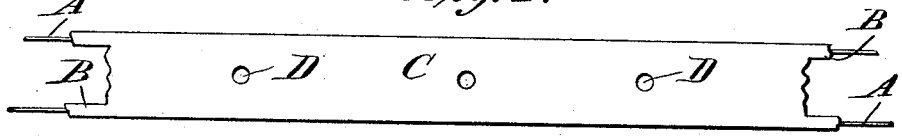
Figure 3:
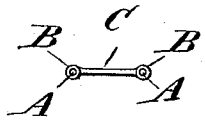
Figure 4:
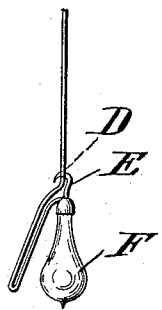

In the accompanying drawings Figures 1 and 2 represent plans of my electrical conductor. Fig. 2 shows the eyelets or openings in the web. Fig. 3 represents a section of the same; and Fig. 4 represents my conductor applied to an electric lamp, which might be any other electrical apparatus, and shows the device for adjusting the height of the lamp or other instrument.

Similar letters of reference designate corresponding parts in the figures.

A designates a number of fine metal wires or any of the ordinary conductors known and used in the art and suitable for the required purpose.

B designates an insulating covering woven around the wires.

C designates the non-conducting web into the edges of which the wires with their previously insulating covering are woven.

In the manufacture of my conductor, the conducting wires or filaments (A) are gummed over, or any of the ordinary prepared cables or conductors are used. Two or more coverings of non-conducting material (B) are woven around them. Then two strands of this product are woven, one along each edge, into the web or taste (C).

D designates eyelets, perforations, button-holes or openings in the middle of the tape, placed at convenient intervals. A hook or similar device (E) may be attached to the top of the electric lamp or other instrument (F), and the height of the instrument adjusted by slipping said hook into one of these openings at any convenient height.

The finished article thus made with a saving of material is flat and straight and the tangling and twisting which are common faults with the conductors now in use are wholly avoided. It is easily and conveniently put up for storage or transportation by being wound on a reel or by any other convenient device. It can also be easily fastened to the walls or any part of a building by tacking through the web (C). It is flexible and can be carried through the walls, or between walls, or around and into any angles, however sharp. It will coil up flat and smooth, so that it can be applied to a drop for lamps by simply being passed around a spring pulley, or by the use of any of the ordinary mechanical means used for such purposes.

By means of the eyelets or openings the conductor can be suspended from pins or hooks provided for the purpose, and the electric current be thus carried to different parts of a room or to different localities and the electric lamp or other instrument be securely placed in different positions as convenience or necessity may require.

Having thus fully described my invention, what I claim as new, and desire to secure by Letters Patent, is—

1. A flexible electrical conductor consisting of a body of flat tape into the edges of which are incorporated previously insulated wires or cables for transmitting electricity substantially as herein set forth.

2. A flexible electrical conductor, consisting of a flat tape, into the edges of which are incorporated the wires or cables for transmitting electricity, and in the center of which are worked, woven, or inserted eyelets, or openings into which can be inserted a hook or similar device attached to a lamp or other instrument, substantially as herein set forth.

3. A flexible electrical conductor, consisting of a flat tape, into the edges of which are incorporated the wires or cables for transmitting electricity, and in the center of which are worked, woven, or inserted eyelets, or openings, for adjusting, placing, or suspending the conductor along different lines of direction at will, substantially as set forth.

In witness whereof I have hereunto set my hand this 17th day of March, A. D. 1893.

GILBERT H. BLAKESLEY.

In presence of—
M. BENJ. HOLDEN,
ALICE E. BROWN.